(12) United States Patent
Ayon et al.

(10) Patent No.: US 9,186,990 B2
(45) Date of Patent: Nov. 17, 2015

(54) ACCEL AND BRAKE

(71) Applicants: Efrain Ayon, Tijuana (MX); Martha Rivera, Richardson, TX (US)

(72) Inventors: Efrain Ayon, Tijuana (MX); Martha Rivera, Richardson, TX (US)

(73) Assignees: Martha L Rivera; Efrain Ayon

( * ) Notice: Subject to any disclaimer, the term of this patent is extended or adjusted under 35 U.S.C. 154(b) by 0 days.

(21) Appl. No.: 14/097,415

(22) Filed: Dec. 5, 2013

(65) Prior Publication Data

US 2014/0157935 A1    Jun. 12, 2014

Related U.S. Application Data

(60) Provisional application No. 61/734,837, filed on Dec. 7, 2012.

(51) Int. Cl.
  *B60K 26/00*    (2006.01)
  *B60K 26/02*    (2006.01)
  *B60T 7/08*    (2006.01)
  *B60W 30/18*    (2012.01)

(52) U.S. Cl.
  CPC . *B60K 26/02* (2013.01); *B60T 7/08* (2013.01); *B60W 30/18181* (2013.01); *B60K 2741/20* (2013.01); *Y10T 74/2039* (2015.01); *Y10T 74/20238* (2015.01)

(58) Field of Classification Search
  USPC .................................. 180/325, 333; 477/209
  See application file for complete search history.

(56) References Cited

U.S. PATENT DOCUMENTS

| | | | | |
|---|---|---|---|---|
| 4,060,697 A | * | 11/1977 | Neal | 381/365 |
| 4,476,954 A | * | 10/1984 | Johnson et al. | 180/333 |
| 4,627,522 A | * | 12/1986 | Ulrich et al. | 192/35 |
| 4,998,983 A | * | 3/1991 | Ruprecht et al. | 477/209 |
| 5,025,905 A | * | 6/1991 | Lenz | 477/209 |
| 5,086,870 A | * | 2/1992 | Bolduc | 180/333 |
| 5,282,522 A | * | 2/1994 | Grindle | 477/209 |
| 5,553,684 A | * | 9/1996 | Bolduc | 180/333 |
| 5,813,944 A | * | 9/1998 | Grindle | 477/209 |
| 6,253,138 B1 | * | 6/2001 | Shober et al. | 701/51 |
| 6,889,791 B2 | * | 5/2005 | Watanabe | 180/271 |
| 7,062,988 B2 | * | 6/2006 | Laukkanen | 180/333 |
| 7,195,096 B1 | * | 3/2007 | Mawhinney | 180/315 |

\* cited by examiner

*Primary Examiner* — Toan To

(57) ABSTRACT

Devices, systems, and methods for a manually controlled operating system for permitting a handicapped person to brake and accelerate an automobile with hand operated controls. The system comprises a brake handle operably coupled to a foot brake pedal with a first cable and an accelerator handle operably coupled to a foot accelerator pedal with a second cable, wherein the brake handle and accelerator handle are positioned within hand reach of the handicapped person while positioned within the automobile.

18 Claims, 1 Drawing Sheet

ACCEL AND BRAKE

CROSS-REFERENCE TO RELATED APPLICATIONS

The present application claims priority to U.S. Provisional Patent Application No. 61/734,837 to Leal et al., filed Dec. 7, 2012, and entitled "Accel and Brake". The present application incorporates this application herein by reference in its entirety.

FIELD OF THE INVENTION

The present invention pertains to the field of automobile aftermarket accessories, and more specifically to the field of hand control mechanisms for driving an automobile.

BACKGROUND OF THE INVENTION

The prior art has put forth several designs for hand control mechanisms for driving an automobile. Among these are:

U.S. Pat. No. 4,078,628 to Anton J. Reichenberger describes an automotive control system for use by handicapped drivers who have lost the functional mobility of their lower extremities. A second wheel concentric with the steering wheel is added such that it is reachable by either the thumb or fingertips when hands are on a steering wheel in normal driving fashion. Movement of this second control wheel in a direction away from the driver actuates the automotive braking system through an electro hydraulic servo system. Pulling the second wheel towards the driver actuates the throttle of the automobile through a similar servo system. The brake and throttle interfaces with existing automotive control systems so that very few additional add on mechanisms are necessary.

U.S. Pat. No. 4,143,734 to Bishnu P. Bhattacharya describes a pair of hand grips claimed to the steering wheel. The grips are connected by a pair of cables extending through flexible tubes to opposite ends of a pivotable bar mounted on the steering column of the steering wheel. The opposite ends of the pivotable bar are respectfully affixed to the accelerator pedal and the brake pedal of the vehicle. Pressure applied by an operator's hands on the hand grips selectively depresses the accelerator pedal and the brake pedal. Springs mounted in the hand grips and at the distal ends of the tube maintain the cables in the open position yieldable to pressure on the hand grips.

U.S. Pat. No. 5,103,946 to John V. Masters and Norris R. Harod describes a hand operated automobile brake and accelerator operation assembly for the handicapped that is readily transferred from car to car without tool and is adaptable to various models of cars. The assembly is installed by clamping manually operable wing nuts on the brake pedal shaft as the sole fixed connecting bracket on the car. The brake pedal and accelerator pedal are respectively operated by pushing and pulling by hand an operating rod to move an operating lever fulcrumed on a pivot axis fixed relative to the brake pedal shaft. This operating lever moves an accelerator operating shaft into contact with the accelerator pedal to depress it as the hand operated rod is pulled. Conversely when pushed, the hand operated rod depresses the brake pedal and releases the accelerator. To accommodate different car models, an accelerator operating shaft has a manually operated lock to fix its length and the accelerator assembly distance from the brake is adjustable.

None of these prior art references describe the present invention.

SUMMARY OF THE INVENTION

It is an object of the present invention to provide an automobile aftermarket accessory that provides limited mobility motorists with hand operated controls for an automobile's accelerator and brake pedals.

In a first aspect, the present invention provides manually controlled operating system for permitting a handicapped person to brake and accelerate an automobile with hand operated controls. The system comprises a brake handle operably coupled to a foot brake pedal with a first cable and an accelerator handle operably coupled to a foot accelerator pedal with a second cable, wherein the brake handle and accelerator handle are positioned within hand reach of the handicapped person while positioned within the automobile.

In another embodiment, the system comprises a box mounted on the steering column within hand reach of the handicapped person while positioned within the automobile, a brake handle operably coupled within the box to a foot brake pedal with a first cable, a portion of the brake handle extending out of the box, and an accelerator handle operably coupled within the box to a foot accelerator pedal with a second cable, a portion of the accelerator handle extending out of the box, wherein the first and second cable extending through openings in the box toward the brake and accelerator.

In another embodiment, a method is disclosed for using a manually controlled operating system for permitting a handicapped person to brake and accelerate an automobile with hand operated controls. The method comprises providing the manually controlled operating system, accelerating the automobile by moving the accelerator handle from a first position to a second position, decelerating the automobile by moving the accelerator handle back toward the first position, braking the automobile by moving the brake handle from a first position to a second position, and releasing the brakes by moving the brake handle back toward the first position.

In many embodiments, the system further comprises first and second gears mounted within the box, wherein the first cable is couple to the brake handle via the first gear and the second cable is couple to the accelerator handle via the second gear.

In many embodiments, the brake handle further includes a first hand grip and the accelerator handle includes a second hand grip.

In many embodiments, the first hand grip and the second hand grip are covered in nonskid rubber.

In many embodiments, the first hand grip and the second hand grip are ergonomic hand grips In many embodiments, the system further comprises locking mechanisms coupled to the brake cable and accelerator cable.

In many embodiments, the locking mechanism on the accelerator cable is a cruise control to lock the accelerator at a designated speed.

In many embodiments, the locking mechanism on the accelerator cable releases when the brakes are applied.

In many embodiments, the box is mounted on the steering column.

DETAILED DESCRIPTION OF THE INVENTION

Whether one suffers limited mobility brought on by disease or an injury to the legs, back or spinal cord, these infirmities often result in the sufferer becoming temporarily or permanently unable to utilize their legs. For those who are able to walk other conditions such as heart ailments or lung disease greatly reduce the sufferer's strength and make simple tasks difficult to complete. For countless consumers who suffer limited mobility and paralysis, operating an automobile is prohibitive because these individuals are unable to control the automobile's foot pedals. Getting behind a steering wheel to take a spontaneous road trip or grocery store run are activities that able bodied consumers take for granted. The freedom associated with performing these activities is something that many disabled consumers give up entirely.

The present invention is a manually controlled operating system for permitting a handicapped person to brake and accelerate an automobile with hand operated controls. The present invention, hereinafter referred to as Accel and Brake, is an aftermarket accessory for motor vehicles comprised of manually operated controls that are connected to the automobile accelerator and brake pedal, enabling a user to operate these components with their hands. The present invention provides consumers who suffer limited mobility, particularly those who have lost the use of their legs, to experience the freedom and independence associated with operating an automobile.

The manually controlled operating system may also be used in a drivers training car. In that situation, there may be two manually controlled operating systems so that the passenger or trainer is able active the brake or accelerator, along with the drive.

Figure 1:
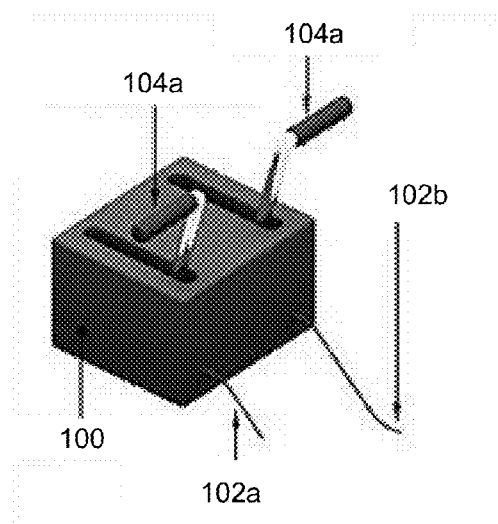
FIG. 1 is a prototypical illustrative dose up view showing a heavy metal box that houses cables and handles including a cable attached to the brakes, a handle to operate brake functionality, a cable attached to the accelerator, and a handle for operating acceleration functionality.

FIG. 1 shows a close up view showing a heavy metal box 100 that houses cables 102a, 102b and handles 104a, 104b including a cable attached to the brakes 102a, a brake handle 104a to operate brake functionality, a cable attached to the accelerator 102b, and an accelerator handle 104b for operating acceleration functionality.

Figure 2:
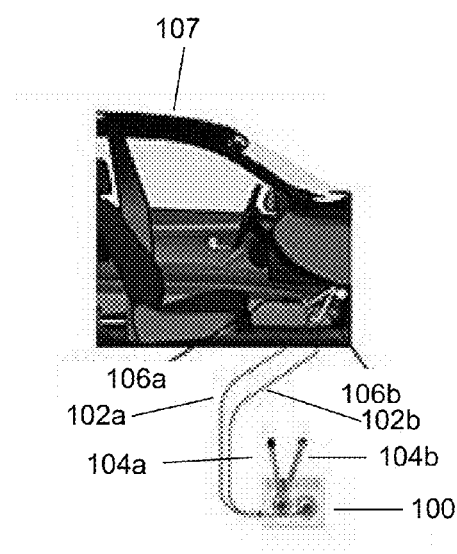
FIG. 2 as a functional side view showing cables attached to brake and accelerator pedals and their connection to internal components shown in an uninstalled metal box illustrated in foreground outside the automobile illustration.

FIG. 2 shows the cables 102a, 102b attached to the brake pedal 106a and the accelerator pedal 106b and their connection to internal components shown in an uninstalled metal box 100 illustrated in foreground outside the automobile illustration. The Accel and Brake heavy metal box 100 is mounted inside an automobile 107 in a practical position within an arm's length of the driver. For example, the box may be positioned next to the driver, for example, on the center console, on the door, or in his lap. The box may also be mounted on the steering column. In some cases, the passenger may be able to reach and activate controls of the box in case the driver needs assistance.

In one embodiment, the brake handle 104a and accelerator handle 104b may be positioned such that they are activated by pulling toward the driver. For example, if the driver wants to accelerate, the accelerator handle would be pulled backward, toward the driver, and the cable pulls the accelerator pedal toward the floor. To decelerate, the accelerator handle would be pushed forward away from the driver and the accelerator pedal would be released and allowed to move away from the floor, back to its natural position. The same orientation could be used for braking. For example, if the driver wants to brake, the brake would be pulled backward, toward the driver, and the cable pulls the brake pedal toward the floor. To release the brakes, the brake handle would be pushed forward away from the driver and the brake pedal would be released and allowed to move away from the floor, back to its natural position.

In another embodiment, the brake handle 104a and accelerator handle 104b may be positioned such that they are activated by pushing away from the driver. For example, if the driver wants to accelerate, the accelerator handle would be pushed forward, away from the driver, and the cable pulls the accelerator pedal toward the floor. To decelerate, the accelerator handle would be pulled backward, toward the driver, and the accelerator pedal would be released and allowed to move away from the floor, back to its natural position. The same orientation could be used for braking. For example, if the driver wants to brake, the brake would be pushed forward, away from the driver, and the cable pulls the brake pedal toward the floor. To release the brakes, the brake handle would be pulled backward, toward the driver, and the brake pedal would be released and allowed to move away from the floor, back to its natural position.

In another embodiment, the brake handle 104a and accelerator handle 104b may be positioned such that one is activated by pulling backward toward the driver and the other is activated by pushing forward away from the driver.

Figure 3:
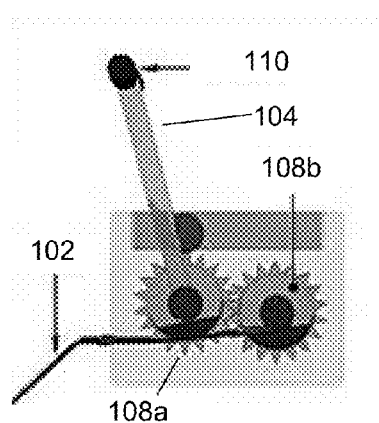
FIG. 3 is a prototypical illustrative close up view showing internal engineering of a handle propelling gears attached to cable going to brake or accelerator pedals.

FIG. 3 shows one embodiment of internal engineering of a handle propelling gears attached to cable going to brake or accelerator pedals. This box 100 measures approximately six and a half inches in length by five inches in width, small enough to conveniently install and mount. Two durable metal gears 108a, 108b reside inside this metal box 100. These gears are externally connected at the base of the box to two elongated cables 102a, 102b which run from the box to the automobiles brake and accelerator foot pedals. One gear 108b and cable assembly 102b is connected to the vehicular accelerator pedal 106b, while the second gear 108a and cable assembly 102a is connected to the brake pedal 106a. Emerging from the top of the box and approximately beside or below the steering column are two ergonomic hand grips 110a, 110b. One hand grip controls the accelerator 110b and the second hand grip controls the brakes 110a. Cylindrical in shape and horizontally connected to the heavy metal box, these handles are grooved and covered in nonskid rubber or comparable coating to ensure a comfortable and secure hold during use.

Figure 4:
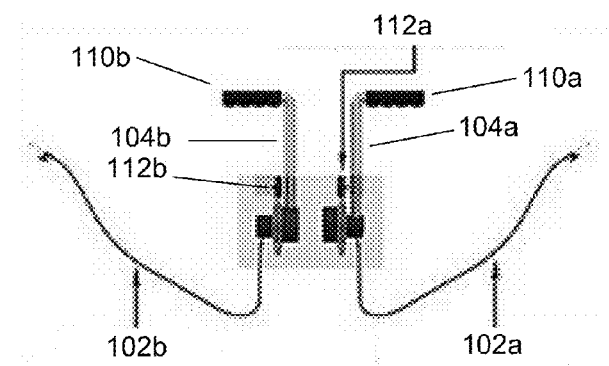
FIG. 4 is a prototypical illustrative close up view showing internal engineering of locking mechanisms attached to brake and accelerator cables.

FIG. 4 shows one embodiment of internal engineering of locking mechanisms 112a, 112b attached to brake 102a and accelerator 102b cables.

Accel and Brake contains a cruise control functionality that enables a user to lock the accelerator at a designated speed. This locking function releases when the automobile's brakes are applied.

A method of using the system is disclosed in which the within hand reach of the handicapped person while positioned within the automobile. To go, the accelerator handle 104b is moved from a first position toward a second position. To decelerate, the accelerator handle 104b is move back toward the first position. To slow down or brake, the brake handle 104a is moved from a first position toward a second position. To release the brake, the brake handle 104a is moved back to the first position.

Accel and Brake is an aftermarket accessory that is easily retrofitted to any existing automobile or is available as an upgrade option on newly manufactured cars and trucks. A fully functional working model is installed in minutes and works with ease and simplicity. Use of the Accel and Brake is very simple and straight forward. After purchasing Accel and Brake, the driver or a skilled helper install it in the automobile. The main control box is mounted in the car in an easily accessed location in front or to the side of the driver's seat. The driver or skilled helper then connects the two elongated cables to accelerator and brake pedal respectively. Accel and Brake is ready for use. Sliding behind the wheel of their automobile, the driver utilizes the Accel and Brake control box to operate the automobile's accelerator and brakes. While driving, the driver activates the present invention's cruise control or lock function for a steady and relaxing drive. Upon arriving at their destination, the driver parks and exits their automobile.

Accel and Brake enables individuals who suffer paralysis, limb amputation and other medical conditions that result in a loss of mobility with a practical means of operating a motor automobile unassisted by another person. Compactly engineered, Accel and Brake in no way encumbers access to and operation of the automobile's other operational controls or functions. Durably constructed, Accel and Brake provides years of reliable use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claim.

The invention claimed is:

1. A manually controlled operating system for permitting a handicapped person to brake and accelerate an automobile with hand operated controls comprising:
   a brake handle operably coupled to a foot brake pedal with a first cable; and
   an accelerator handle operably coupled to a foot accelerator pedal with a second cable;
   wherein the brake handle and accelerator handle are positioned within hand reach of the handicapped person while positioned within the automobile;
   wherein the brake handle and the accelerator handle are mounted within a box with the first and second cable extending through openings in the box;
   wherein the box is mounted on the steering column.

2. The system of claim 1, further comprising first and second gears mounted within the box, wherein the first cable is couple to the brake handle via the first gear and the second cable is couple to the accelerator handle via the second gear.

3. The system of claim 1, wherein the brake handle further includes a first hand grip and the accelerator handle includes a second hand grip.

4. The system of claim 3, wherein the first hand grip and the second hand grip are covered in nonskid rubber.

5. The system of claim 3, wherein the first hand grip and the second hand grip are ergonomic hand grips.

6. The system of claim 1, further comprising locking mechanisms coupled to the brake cable and accelerator cable.

7. The system of claim 6, wherein the locking mechanism on the accelerator cable is a cruise control to lock the accelerator at a designated speed.

8. The system of claim 7, wherein the locking mechanism on the accelerator cable releases when the brakes are applied.

9. A manually controlled operating system for permitting a handicapped person to brake and accelerate an automobile with hand operated controls comprising:
   a box mounted on the steering column within hand reach of the handicapped person while positioned within the automobile;
   a brake handle operably coupled within the box to a foot brake pedal with a first cable, a portion of the brake handle extending out of the box; and
   an accelerator handle operably coupled within the box to a foot accelerator pedal with a second cable, a portion of the accelerator handle extending out of the box;
   wherein the first and second cable extending through openings in the box toward the brake and accelerator.

10. The system of claim 9, further comprising first and second gears mounted within the box, wherein the first cable is couple to the brake handle via the first gear and the second cable is couple to the accelerator handle via the second gear.

11. The system of claim 9, wherein the brake handle further extending out of the box includes a first hand grip and the accelerator handle extending out of the box includes a second hand grip.

12. The system of claim 11, wherein the first hand grip and the second hand grip are covered in nonskid rubber.

13. The system of claim 11, wherein the first hand grip and the second hand grip are ergonomic hand grips.

14. The system of claim 9, further comprising locking mechanisms coupled to the brake cable and accelerator cable.

15. The system of claim 14, wherein the locking mechanism on the accelerator cable is a cruise control to lock the accelerator at a designated speed.

16. The system of claim 14, wherein the locking mechanism on the accelerator cable releases when the brakes are applied.

17. A method of using a manually controlled operating system for permitting a handicapped person to brake and accelerate an automobile with hand operated controls comprising:
   providing the manually controlled operating system comprising:
      a box mounted on the steering column within hand reach of the handicapped person while positioned within the automobile;
      a brake handle operably coupled within the box to a foot brake pedal with a first cable, a portion of the brake handle extending out of the box; and
      an accelerator handle operably coupled within the box to a foot accelerator pedal with a second cable, a portion of the accelerator handle extending out of the box;
      wherein the first and second cable extending through openings in the box toward the brake and accelerator;
   accelerating the automobile by moving the accelerator handle from a first position to a second position;
   decelerating the automobile by moving the accelerator handle back toward the first position;
   braking the automobile by moving the brake handle from a first position to a second position; and
   releasing the brakes by moving the brake handle back toward the first position.

18. The method of claim 17, wherein the manually controlled operating system further includes a locking mechanism on the accelerator cable, the method further comprising:
   setting the cruise control by locking the accelerator cable with the locking mechanism at a designated speed; and unlocking the locking mechanism when the brakes are applied.

* * * * *